No. 756,539. PATENTED APR. 5, 1904.
P., P. W. & J. W. SOMMER.
STRETCHER.
APPLICATION FILED JAN. 27, 1903.
NO MODEL.
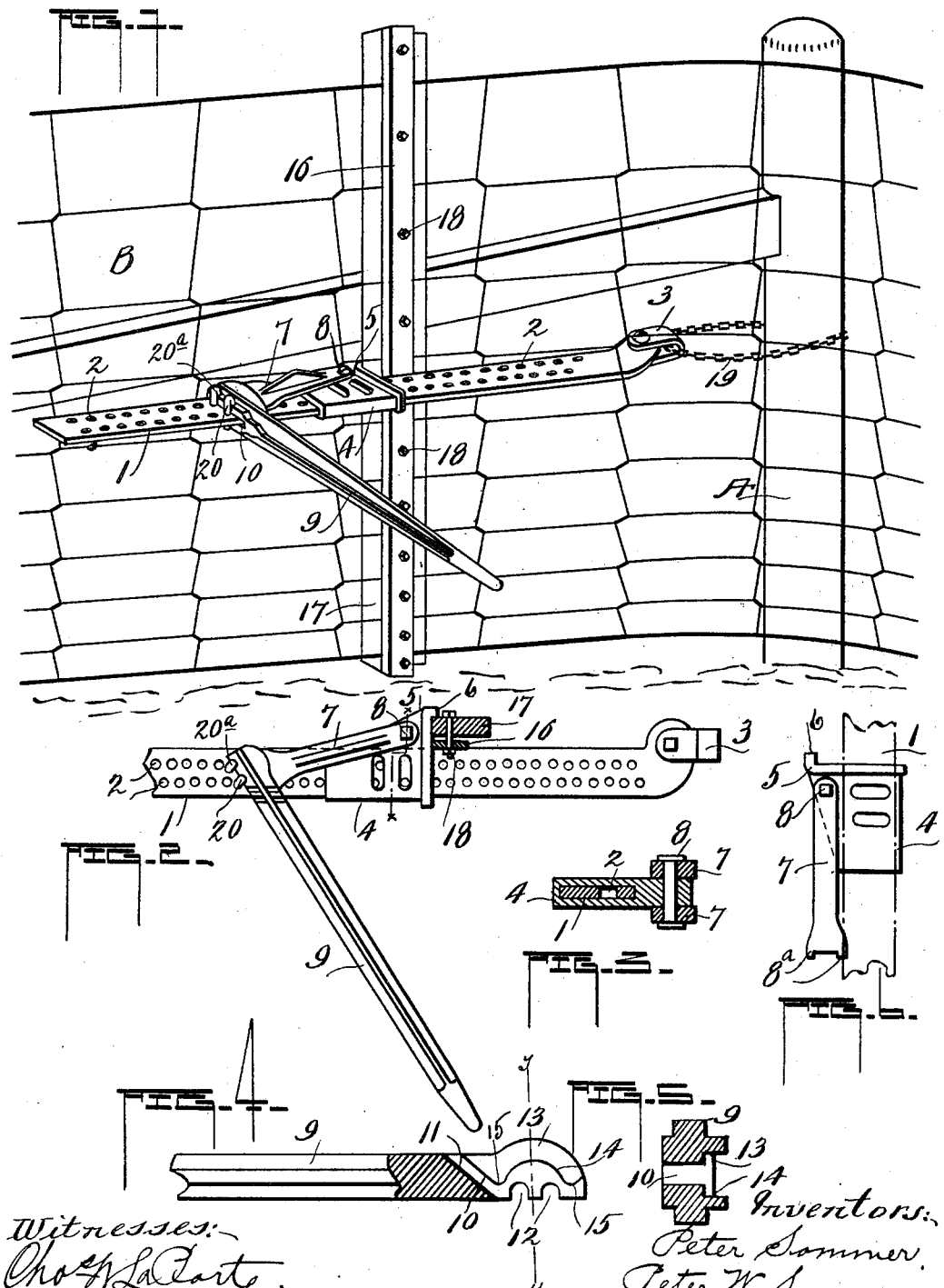
Witnesses:
Chas. H. LaPorte.
Robert N. McCormick
Inventors:
Peter Sommer.
Peter W. Sommer.
Joseph W. Sommer.
By W. V. Tefft, atty.
THE NORRIS PETERS CO., PHOTO-LITHO., WASHINGTON, D. C.

No. 756,539. Patented April 5, 1904.

UNITED STATES PATENT OFFICE.

PETER SOMMER, PETER W. SOMMER, AND JOSEPH W. SOMMER, OF PEORIA, ILLINOIS.

STRETCHER.

SPECIFICATION forming part of Letters Patent No. 756,539, dated April 5, 1904.

Application filed January 27, 1903. Serial No. 140,819. (No model.)

*To all whom it may concern:*

Be it known that we, PETER SOMMER, PETER W. SOMMER, and JOSEPH W. SOMMER, citizens of the United States, residing at Peoria, in the county of Peoria and State of Illinois, have invented certain new and useful Improvements in Stretchers; and we do hereby declare that the following is a full, clear, and exact description of the invention, which will enable others skilled in the art to which it appertains to make and use the same.

This invention relates to a wire-fence-stretching apparatus, and has for its object to facilitate the stretching of one or a series of strand-wires of a fence structure.

The invention comprises a clamp-bar to be secured to the loose end of the fence and a perforated draw-bar provided with a shiftable sleeve for engaging the clamp-bar and mechanism for pushing the sleeve on the bar for stretching the fence through the clamp and means of fixedly retaining the parts in adjusted positions and to details hereinafter more fully described, and illustrated in the accompanying drawings, forming a part of this specification.

Figure 1 is a perspective view illustrating the practical application of our stretcher when stretching wire fencing. Fig. 2 is a plan view of the stretching apparatus and clamp-bar, the latter shown in cross-section. Fig. 3 is a cross-section on the line X X, Fig. 2, of the shiftable sleeve and the draw-bar. Fig. 4 is an enlarged plan of the forward portion of the lever with a portion thereof in section to show that portion which straddles the draw-bar. Fig. 5 is a cross-section through the forward end of the lever as the same would appear on the line Y Y of Fig. 4 of a complete lever. Fig. 6 is a detail plan of certain parts.

Like characters indicate corresponding parts of the figures.

1 refers to the draw-bar, substantially rectangular in shape and provided with a series of perforations 2, arranged in two rows in angles obliquely to each other, and attached to one end of the draw-bar is shown a clevis 3.

4 indicates a sleeve slidably arranged on the draw-bar and has the widened portion 5 and the hooked-shaped portion 6, and 7 is a bar or reach pivoted at 8 to the sleeve 4. This bar is used in duplicate, one above and one beneath the sleeve, as shown in cross-section in Fig. 3, and the same have flared ends, with the offset or lug portions $8^a$ for a purpose to be described.

9 refers to a lever having a flared forward portion, and the same is slotted at 10 for the purpose of straddling the draw-bar and has a beveled inner face 11.

12 refers to duplicate semicircular notches or perforations cut through parts of the lever formed by the open slotted way 10. In these portions of the lever are provided the offsets 13, and the body of each of the opposite parts on the lever has the rounded portions 14 and the cavities or depressions 15.

A clamp-bar is provided in connection with the stretcher and comprises the metal strip or bar 16, adjustably connected with a beam or post 17 by means of bolts 18.

To describe the practical application and operation of the stretching apparatus for fencing as above set out, referring to Figs. 1 and 2, with the following description, the same will be better understood: A is an anchor-post forming a part of the fence structure to which it is designed to connect the draw-bar by means of a chain or similar device 19 by passing the same around the anchor-post and through the clevis, securing the ends of the chain in a suitable manner. To the fence, which is referred to as B, is fastened or attached the clamp-bar within convenient reach of the sleeve 4, so that the hooked-shaped portion of the same will lap the rear face of the clamp-bar, and the same is designed to be located when starting the stretching near to the rear end of the bar, and the strand-wires are placed between the metal bar and the post and intermediate the bolts 18 for securely fastening the fence to the clamp-bar. The lever is placed with the slotted end over the draw-bar in such a manner as to have the lug extensions $8^a$ of the reach 8 to alternately engage the cavities or depressions 15 as the lever is forced back or is forced forward on the draw-bar. 20 20ª refer to pins to be inserted in the perforations 2 of the draw-bar and in a manner to engage the semicircular notches 12 in the lever. Referring to Fig. 2, it will be noticed that if the lever were pulled to the left the pin 20, acting as a pivotal point, would cause the reaches 7 to be thrust forward, carrying with them the sleeve 4 and forcing the clamp-bar forward, and when the outer notch 12 of the lever is coincident with the next succeeding perforation lying in a line obliquely to the pivotal pin 20 the pin 20ª would be removed from its present position in Fig. 2 and be inserted in the next succeeding perforation, as described. The pivotal point is then removed to the pin 20ª and the lever moved backward and forward, inserting the pins in one hole and then another until the fence is tight enough, when the same is fastened to the fence-post A. The shifting of the lever causes the lug or projections 8ª of the reach 7 to engage first one cavity or depression 15 and then the opposite one, which will retain the parts in perfect working relation to each other, the end of the reaches working against the rounded faces of the parts of the lever, referred to as 14. The pivotal point of the reach is in a line directly in front of the clamp-bar, which permits the thrust of the same directly against the bar.

The arrangement of the apparatus is such that it is reversible, so that it may be operated from either side of the fence and will stretch a fence to a post set against the side of a building as conveniently as anywhere.

We do not wish to be limited to the details of construction and arrangement as herein set out, as we are aware that various changes may be made and details resorted to without affecting the principle of invention herein.

Having thus fully described our invention, what we claim, and desire to secure by Letters Patent of the United States, is—

1. In an apparatus of the character described, the combination of a perforated draw-bar, a clamping part slidable relative to the fixed position of the bar and in juxtaposition thereto, a member slidable on the bar having portions for engaging and guiding the clamp in its movement, a lever having multiple movable fulcrum-points, means coöperating with the fulcrum-points of lever and perforations in the bar, and connections between the lever and slidable member, substantially as specified.

2. In a fence-stretching apparatus, the combination of a draw-bar with perforations lying in angles oblique to each other, a two-part clamp, a sleeve slidable on the bar with a hooked-shaped end engaging the clamp, a lever having semicircular notches and straddling the bar, pins to engage the notches of the lever and perforations in the bar when coincident, and a reach from the sleeve engaged by the lever, substantially as described.

3. In a fence-stretcher, the combination with an anchor-post, of a draw-bar connected to the post and provided with two rows of perforations lying oblique to each other, a clamping device arranged transverse to the length of the bar, a sleeve slidable on the bar having means engaging the clamping device, a lever having bifurcated extensions to straddle the bar and a pair of notches in the side of said extensions, a reach pivotally secured to the sleeve and engaging the lever, and a pair of pins alternately coöperating with the notches in the lever and perforations of the bar when the notches and perforations are brought coincident, substantially as described.

4. In a fence-stretcher the combination with an anchor-post, of a draw-bar connected to the post and provided with two rows of perforations lying oblique to each other, a clamping device arranged transverse to the length of the bar, a sleeve slidable on the bar having means engaging the clamping device, a lever having extensions straddling the bar and provided with depressions on the matching faces of the extensions and a pair of notches in their sides, reaches pivotally secured to the sleeve and having studs adapted to alternately engage the depressions in the extensions of the lever, and pins coöperating with the notches in the lever and perforations in the bar, substantially as described.

5. Stretching mechanism, comprising a draw-bar carrying a clevis on one end, a two-part clamping device carried in juxtaposition to the bar, a sleeve slidably arranged on the bar having means engaging the clamp, a hand-lever fulcrumed on the bar having multiple fulcrum-points, and means having a fixed connection with the sleeve and duplicate engaging points with the lever for advancing the clamping part in advance of the sleeve when applying power to the lever, substantially as described.

6. A stretching apparatus, consisting of a fixed draw-bar, a vertically disposed and movable clamping part, a member slidable on the bar having a hooked portion engaging the clamping part, a reach pivoted to the slidable member in line with the clamping part, a lever straddling the bar, movable center pins for said lever whereby its points of fulcrum may be intermittently changed, said lever where it straddles the bar engaging the reach, substantially as specified.

7. A stretching apparatus, comprising a perforated draw-bar, a transversely-disposed clamping-body, a slidable member on the bar having means for engaging the clamping-body, a lever having a slotted forward portion adapted to straddle the draw-bar and provided with depressions 15, oppositely-disposed reaches 7 pivotally attached to the slidable member and having means for alternately engaging the depressions 15 of the lever, and pins forming fulcrum-points for the lever on the bar and movable on oblique lines for advancing the lever on the bar and locking the lever in adjusted positions, substantially as described.

In testimony whereof we affix our signatures in presence of two witnesses.

PETER SOMMER.
PETER W. SOMMER.
JOSEPH W. SOMMER.

Witnesses:
Wm. E. Getz,
Wm. Sommer.